Patented Sept. 23, 1952

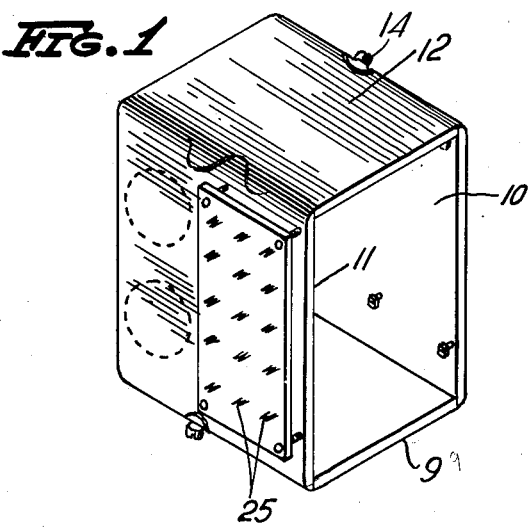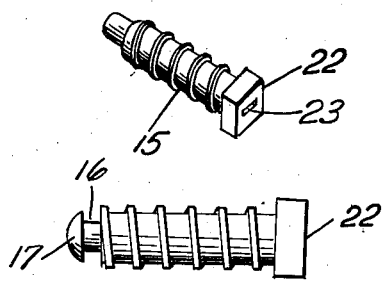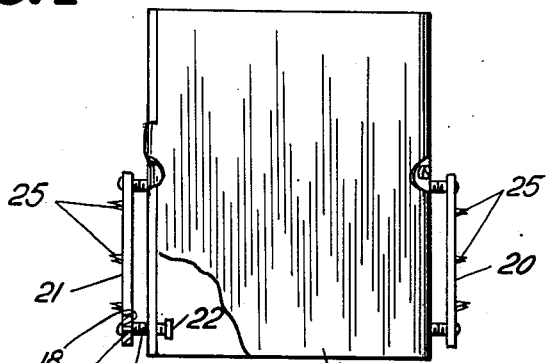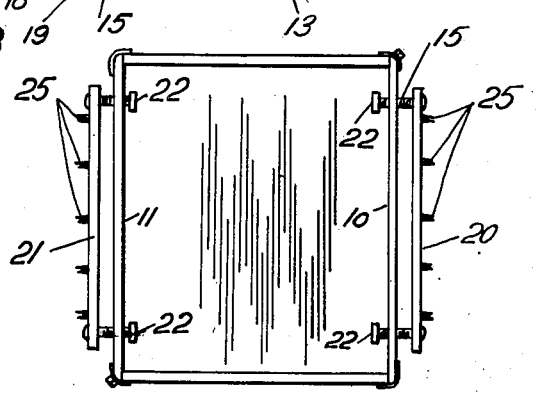

2,611,501

UNITED STATES PATENT OFFICE 2,611,501

WALL BOX

Louis D. Bermann, Ossining, N. Y.

Application September 8, 1949, Serial No. 114,609

2 Claims. (Cl. 220—3.5)

This invention relates to wall boxes, such, for example, as medicine cabinets, inset paper holders, and especially the "utility boxes" used to house the electrical switches and connections of the wiring system of a building.

Standard utility boxes are primarily adapted for use in new buildings where they are installed prior to the putting on of the wall-board, plaster, or other interior surface; and the mounting of the utility box in such instances is a comparatively simple procedure. When, however, a utility box is to be installed in an existing building, the procedure is fraught with difficulty because of the necessity of cutting in the wall a hole which is at once small enough to be covered by a standard cover plate or other unsightly covering and at the same time large enough to leave room for the utility box to be effectively secured in place. As a practical matter, the first of these considerations is a limiting factor on the second, and, as a result, the installation of utility boxes in existing buildings must be done in cramped quarters for which the box is in no way adapted.

Various proposals for simplifying the installation of utility boxes in existing buildings have been brought forward, but these have been primarily directed to the solution of specific problems in specific types of walls so that each of them has had only a limited field of use. This, and the consequent necessity of a retailer stocking numerous types of boxes or none, has had a decided deterrent effect on the stocking of anything but the standard utility box. Similar considerations apply to other types of wall boxes.

With the foregoing and other considerations in view, the present invention contemplates the provision of a wall box which can be installed with the utmost ease in a space behind a relatively narrow opening and which can be firmly, effectively and permanently secured in place by a simple operation.

The invention accordingly comprises an article of manufacture possessing the features, properties, and the relation of elements which will be exemplified in the articles hereinafter described and the scope of the application of which will be indicated in the claims.

For a fuller understanding of the nature and objects of the invention, reference should be had to the following detailed description taken in connection with the accompanying drawings, in which:

Figure 1 is a perspective view of a utility box embodying the invention;

Fig. 2 is a top view thereof;

Fig. 3 is a front view thereof; and

Figs. 4 and 5 are, respectively, a perspective view of one of the expansion screws before assembly, and a side view thereof in the form in which it exists after assembly.

In the particular form of construction exemplified, the utility box is of standard construction, comprising a bottom wall 9, side walls 10 and 11, a top wall 12, and a rear wall 13, the walls being releasably secured together, as by screws 14, to permit assembly as a single box or as a plural box of the gang assembly type. These walls may be composed of suitable stiff material such as sheet metal.

In each of the side walls 10 and 11 there are provided threaded bores in which expansion screws 15 are screwed. The screws 15 in the present instance are formed at their outer ends with a recess 16 which, as exemplified, is annular and outside of which is a flange 17. The recesses 16 are adapted to receive the rims 18 of holes 19 in clamping plates 20 and 21, respectively. In assembly, the flanges 17 may be formed, as by hammering down the ends of screws such as shown in Fig. 5 after insertion in the holes.

While the invention in its broader aspects contemplates the provision of any desired number of screws on each side of the box, in its more specific aspects the invention contemplates the highly advantageous use of a multiplicity of three, four, or more screws on each side to give a firm holding action, while at the same time permitting the box to be fitted square with the wall even though its opening is cut at an angle.

It is to be noted that the screws are formed with polygonal (square in the present instance) heads 22 so that they can be tightened by pliers or a wrench, if desired. They are also formed with screw slots 23 for operation by a short or bent screw driver, a coin, or other screwing device.

In operation, the screws being in an inward position in which they hold the plates 20 and 21 close to their respective sides 10 and 11, the utility box is inserted into the wall opening—which may be exceptionally narrow, roughly formed, irregular, or slanted. The screws are then turned, each a sufficient amount to thrust a portion of its plate 20 or 21 outwardly into contact with the plaster, wall board, joist, brick, or other material of which the wall is formed. Whatever the material of the wall and whatever its thickness, the plates will press firmly into clamping engagement with it, and by a simple securing action the utility box will be held firmly in place, without the necessity of the use of metal ears or of any additional breaking of an existing wall. They are moreover held releasably in place, so as to permit easy removal or replacement of the box; or to permit its adjustment outwardly, as when tile or other supplemental wall covering is applied at a later date.

In its more specific aspects, the invention contemplates the provision of gripping members on the exterior of the plates 20 and 21. As exemplified, these are formed by punching out the metal of the plates from the rear before they are put in place so as to provide projections 25 on their exterior surfaces. The spikes thus produced will cut into wood, plaster, or other wall material to provide a particularly effective grip.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A wall box comprising an enclosure open at one end surrounded by four side walls, rigid plates movably disposed outside opposed walls of said enclosure, and screws expansibly connecting said plates with their respective walls and being threaded in the side wall substantially perpendicular thereto and rotatably gripped by the plate.

2. A wall box comprising an enclosure open at one end surrounded by four side walls, rigid plates movably disposed outside opposed walls of said enclosure, polygonally-headed screws expansibly connecting said plates with their respective walls and being threaded in the side wall substantially perpendicular thereto and rotatably gripped by the plate, and gripping projections on the outer surface of said plates.

LOUIS D. BERMANN.

REFERENCES CITED

The following references are of record in the file of this patent:

UNITED STATES PATENTS

| Number | Name | Date |
| --- | --- | --- |
| 1,265,744 | Canfield | May 14, 1918 |
| 1,662,422 | Hodges | Mar. 13, 1928 |
| 1,779,681 | Smith et al. | Oct. 28, 1930 |
| 1,978,401 | DeWitt Burton | Oct. 30, 1934 |
| 2,297,862 | Bachman | Oct. 6, 1942 |
| 2,315,746 | Stewart | Apr. 6, 1943 |